June 7, 1966        G. S. KNOX        3,254,873

VALVE SEAL EXPANSION OR DISPLACEMENT COMPENSATION

Filed Dec. 17, 1962        3 Sheets-Sheet 1

GRANVILLE S. KNOX
INVENTOR.

BY White & Haefliger
ATTORNEYS.

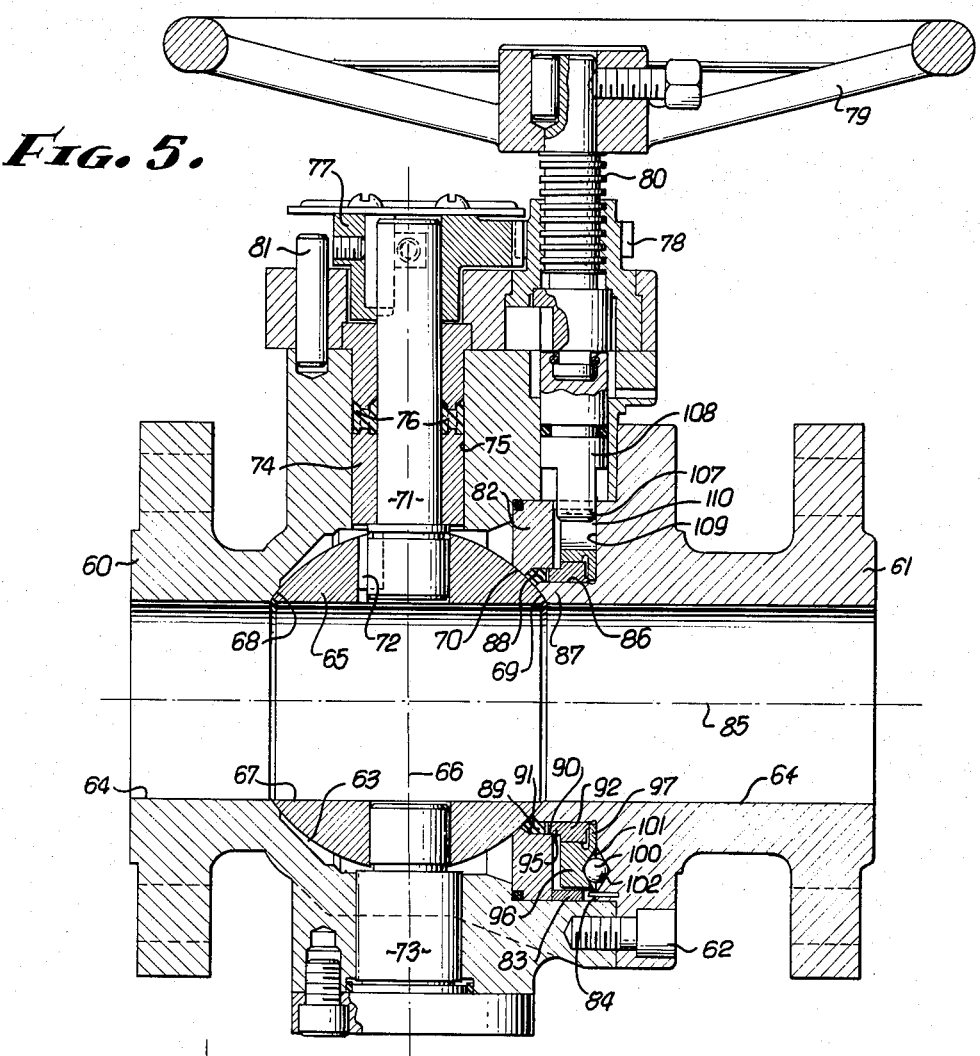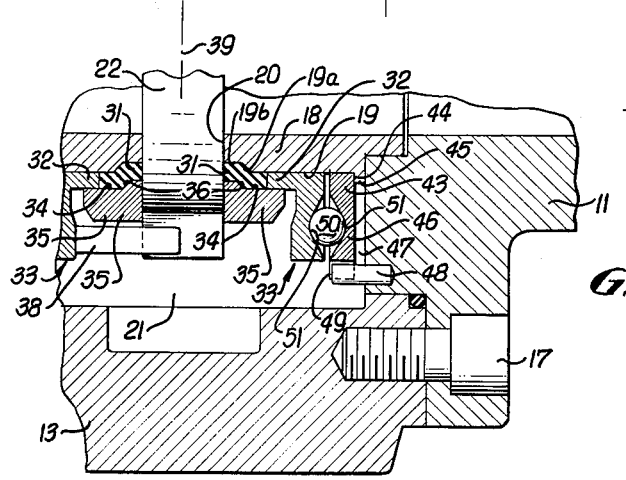

June 7, 1966   G. S. KNOX   3,254,873
VALVE SEAL EXPANSION OR DISPLACEMENT COMPENSATION
Filed Dec. 17, 1962   3 Sheets-Sheet 3

GRANVILLE S. KNOX
INVENTOR.

BY White & Haefliger
ATTORNEYS

United States Patent Office 3,254,873
Patented June 7, 1966

1

3,254,873
VALVE SEAL EXPANSION OR DISPLACEMENT COMPENSATION
Granville S. Knox, Glendale, Calif., assignor to Hydril Company, Los Angeles, Calif., a corporation of Ohio
Filed Dec. 17, 1962, Ser. No. 245,104
13 Claims. (Cl. 251—171)

This invention relates generally to the sealing of valves against fluid pressure, and more particularly concerns compensating action for keeping a relatively constant pressurizing force against plastic valve port seals to accommodate thermal expansion and contraction of parts and also movement of the valve stopper toward and away from the port seal in closed or flow restricting position.

It is a major object of the invention to provide for valve seal compensation in an environment wherein the seal is subject to thermal expansion and contraction at a rate greater than that of the structure confining the seal, this circumstance tending to cause excessive pressurization of the seal at elevated temperatures and under pressurization at low temperatures, as will be brought out. Such an environment may for example exist where the valve assembly includes body structure forming a chamber having inlet and outlet passages for flowing fluid therethrough, and a stopper structure movable into and out of flow restricting position within the chamber, and wherein certain of the structure forms a cavity extending about a chamber flow zone for receiving the internally tenacious plastic packing annulus, the cavity being blocked by other of such structure when the stopper is in flow restricting position. Under such circumstances, means is provided for transmitting pressure acting to thrust the packing annulus toward and into sealing engagement with such other structure when the stopper is in flow restricting position.

However, when the packing annulus which may for example comprise molded tetrafluoroethylene, is subjected to heating, it tends to swell relative to such confining structure, and upon cooling, it tends to shrink making it difficult to maintain the desired degree of packing pressurization. The same problem is found to exist in those instances where the stopper structure in closed position moves within its tolerance or deflection limitations toward and away from the packing in response to variations in line pressure.

The present invention, in providing a simple and ingenious solution to the above difficulties, is founded on the principle that the transmission of pressure acting to thrust the packing toward and into sealing engagement with said other structure may be accomplished in such a way as to yieldably accommodate or compensate for relative expansion or displacement of the packing without relieving, or otherwise detrimentally increasing or decreasing, the pressure transmission to the packing. As will be brought out, this principle is broadly implemented through the incorporation with the pressure transmitting means of a resilient and flexible part positioned to flex and thereby store energy for maintaining the essential pressurization of the packing during any subsequent movement thereof such as may be caused by shrinkage, growth, or displacement of the pressurized packing.

More specifically, the pressure transmitting means may include an annular thrust ring and a resilient flexible part positioned to flex and store energy during pressurization of the packing, this stored energy furnishing the essential pressurizing force acting to effect and maintain the seal, during any subsequent displacement of the packing as may be induced by thermal expansion and contraction or mechanically produced deflection of the pressurized packing. Also, spaced stop shoulders are desirably provided

2 for interengagement to limit flexing of the flexible part, thereby to prevent over-deflection thereof.

Other aspects of the invention include the provision of a control actuable to move the stopper to closed position and thereafter effect movement of the thrust ring and flexible part to transmit the desired pressure in response to control actuation, the provision of a flat spring flexure on which a stop shoulder is carried, the inclusion of antifriction camming in the path of rotation of at least one of the thrust ring and cam member carrying the flexure, and the incorporation of the invention on both gate and plug type valves.

These and other objects and advantages of the invention, as well as the details of an illustrative embodiment, will be more fully understood from the following detailed description of the drawings, in which:

FIG. 4 is an enlarged fragmentary section taken through the valve on a line such as indicated at 4—4 in FIG. 2.

FIG. 5 is a vertical section taken through a plug type valve incorporating the invention.

Figure 1:
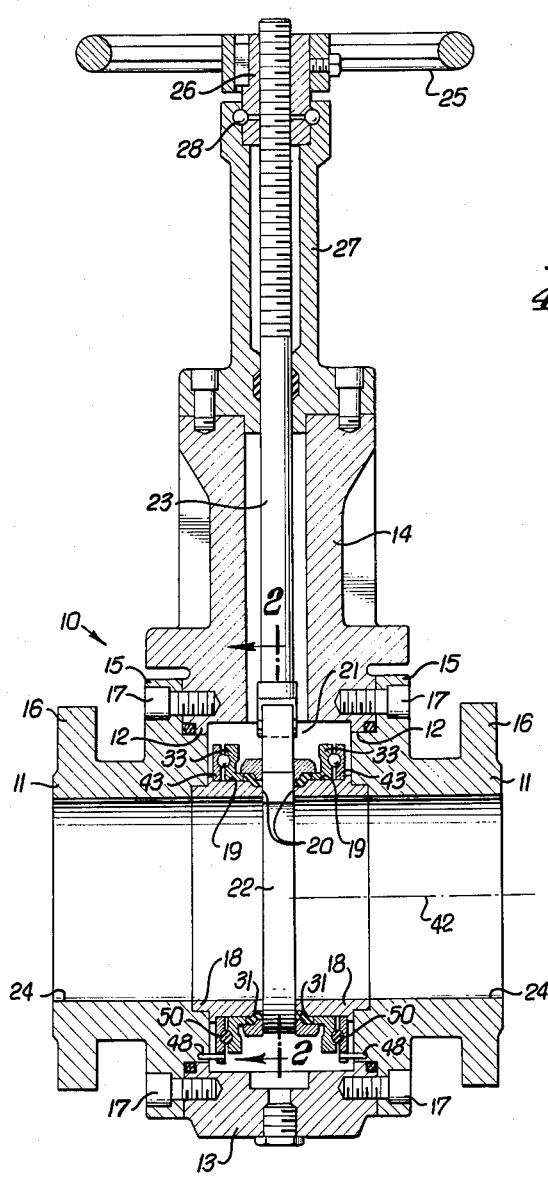
FIG. 1 is a vertical section taken through a gate valve incorporating the invention, and showing the gate moved into flow restricting position.

The valve assembly generally indicated at 10 in FIG. 1 includes a pair of similar flanged body caps 11 symmetrically connected into opposite ends of a lateral bore 12 formed by a body annulus 13 integral with extension 14, each cap 11 including a pair of laterally spaced vertical flanges 15 and 16, the former being connected by fasteners 17 with annulus 13 and the latter being connectible to piping not shown. Caps 11 carry similar reduced dimension cylindrical bosses 18 having outer surfaces 19 spaced from the annulus 13 and spaced opposite end faces 20, these spaces together forming a valve chamber generally indicated at 21 and within which valve gate 22 is longitudinally movable relatively up and down by rod 23 for controlling the flow of fluid through the chamber and the coaxial inlet and outlet valve passage 24 formed by the two body caps 11 at opposite chamber sides. Vertical rod displacement is effected by rotating handwheel 25 keyed to nut 26, which is in turn threaded to the upper end of the rod, the nut being mounted for friction free rotation in the bonnet 27 by ball bearing 28, yet retained thereby against axial displacement.

The gate itself is in the form of a relatively narrow plate extending in a plane normal to the direction of flow through passages 24, and contains an inverted T-shaped recess 29 extending laterally through the upper portion of the gate for loosely retaining an inverted square T-head 30 carried at the lower end of rod 23. As a result the gate, which cannot rotate in the chamber 21 about a vertical axis, prevents rod rotation upon turning of the nut 26 since the straight walls of recess 29 interfere with rotation of the T-head 30. At the same time, the loose mounting of the gate on the rod permits slight lateral shifting of the gate sufficient for adjusting itself in pressure equalizing sealing engagement with the two packing annuli 31 at opposite sides of the gate.

The packings preferably comprise relatively rigid internally tenacious plastic material such as molded tetrafluoroethylene or asbestos capable of bodily displacement primary in a single direction under high pressure, as distinguished from plastic flow in different directions as is characteristic of natural or synthetic rubber under the same pressure conditions.

Extending the description to FIG. 4, each packing annulus 31 is mounted on the outer stepped surface 19a and 19b of one of the bosses 18 for lateral bodily displacement toward and away from a side of the gate 22, such displacement being effected by the annular projections 32 on thrust rings 33 riding on surface 19. In this regard, the projections 32 project into the cavities 34, each of which is formed between a boss 18 and a floating body ring 35 which functions as a retainer for the packing. Each retainer ring 35 has a shoulder 36 facing laterally toward the packing material, so that thrusting of the packing 31 toward the gate 22 carries the floating ring 35 into engagement with the gate, thereby providing a substantially complete confinement of the packing against outward pressural extrusion from the cavity 34 and between the ring and the gate. This purpose is further served by forming the cavity and the packing therein in stepped configuration as shown, the packing having beveled shoulders engaging the bevels 19a on boss 18 and 36 on the retainer ring 35.

Figure 2:
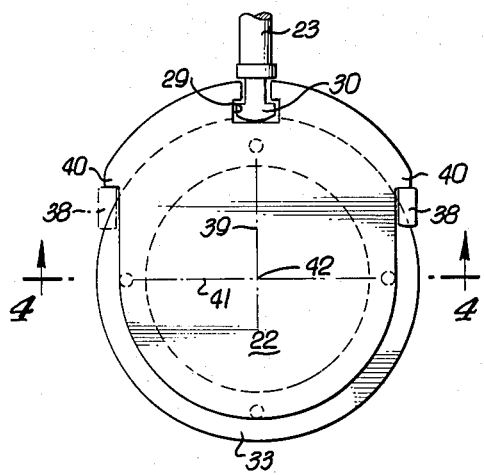
FIG. 2 is a section taken on line 2—2 of FIG. 1, showing the gate as it engages the thrust rings operable to bodily displace the packing annuli.
Figure 3:
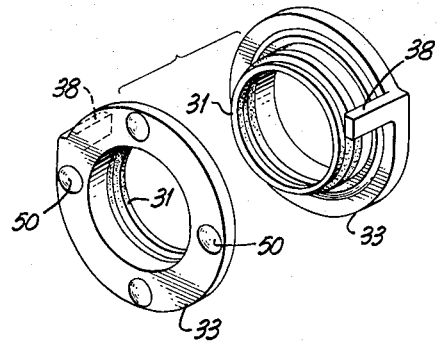
FIG. 3 is a perspective view of the two thrust rings and packing annuli.

A pair of integral lugs 38 project laterally across chamber 21 on opposite sides of vertical gate axis 39, as shown in FIG. 2, for engagement with opposite gate ears 40 on downward stopper displacement. The lugs are carried above a horizontal plane 41 through axis 42 of passages 24 so that they will tend to rotate away from vertical axis 39 and from the gate edges as they are simultaneously forced downwardly by the gate ears, producing relatively opposite thrust ring rotation about axis 42. The loose fit between the T-head 30 and recess 29 accommodates limited rocking movement of the gate, which is sufficient should one lug 38 be engaged before the other for engagement of both lugs prior to effective ring rotation.

As pointed out previously, the thrust rings constitute a portion of the means for transmitting pressure acting to thrust the packing toward and into sealing engagement with structure such as the stopper gate, when the stopper is in flow restricting position. In accordance with the invention, the pressure transmitting means also includes a resilient part positioned to flex and store energy during pressurization of the packing and thereby maintain essential pressure against the packing to compensate for subsequent movement of the pressurized packing. As embodied in that form of the invention shown in FIGS. 1 and 4, the resilient part 46 of member 43 is positioned to flex and store energy during pressurization of the packing. In this connection, it will be understood that subsequent flexing may occur in response to bodily displacement of the thrust ring 33 in a direction toward and away from the packing as induced by corresponding deflection of the packing such as may be caused by thermal shrinkage and growth of the packing or by bodily movement thereof by the gate as the latter deflects laterally within the tolerances between the gate and the bosses 18.

The flexure 46 is shown in the form of a flat spring which is annular and extends in a plane generally normal to the axis 42 of the thrust ring. Further, the member 43 has an inner shoulder 44 retained against rightward displacement by a flange 45 on the boss 18, whereby the flexure 46 is free to deflect rightwardly as shown in FIG. 4, and into the gap 47.

The means for transmitting pressure includes an antifriction cam element or elements in the path of rotation of one of the ring 33 and member 43 or flexure 46, for the purpose of engaging and axially bodily moving at least said one component during rotation thereof. As shown in FIG. 4, rotation of the flexure 46 is prevented by a pin 48 retained by body cap 11 and projecting into a notch 49 cut in the periphery of the flexure. The cam elements are shown to comprise a circularly spaced series of rollers such as balls 50, these being equally circularly spaced about the axis 42 and fitting within opposite conical recesses 51 in opposite faces of the thrust ring 33 and flexure 46. Since the balls 50 extend generally in the path of relative rotation of ring 33 and flexure 46, and since the flexure is held against rotation, the ring 33 is urged toward the packing 31 and the gate in response to rotary movement thereof. The balls 50 then roll up on opposite conical recess walls inclined in the direction of ring rotation and laterally toward the gate as seen in FIG. 4. Thus, lateral thrust is transmitted to the packing annuli 31, bodily displacing them into sealing engagement with opposite sides of the gate in flow restricting position, while the packings remain confined.

From the foregoing, it will be understood that the stopper is first moved to flow restricting position by control mechanism, which thereafter effects movement of the thrust ring to transmit the pressure to the packings for sealing the gate. Upon such sealing, continued forward rotation of the hand wheel 25 of the control will be accompanied by deflection of the flexures 46 as previously described, with sharply increasing resistance to hand wheel rotation, whereby the operator then knows that the valve is properly sealed. The flexure 46 may subsequently be flexed to greater or less extent as caused by bodily movement of the packing in a rightward or leftward direction as seen in FIG. 4. This bodily movement is relatively small and energy stored in the flexure is sufficient to maintain essential pressurization of the packing to compensate for normal changes in temperature and pressure after the initial pressurization of the packing.

Reverse rotation of the handwheel retracts the gate, releases the thrust rings and relieves the sealing pressure on the packing annuli, so that the gate may be withdrawn upwardly without interference by the packings. The rings 33 may then rotate relatively backwardly so that the balls 50 become centered in the conical recesses and the packings are free to fully retract.

Figure 6:
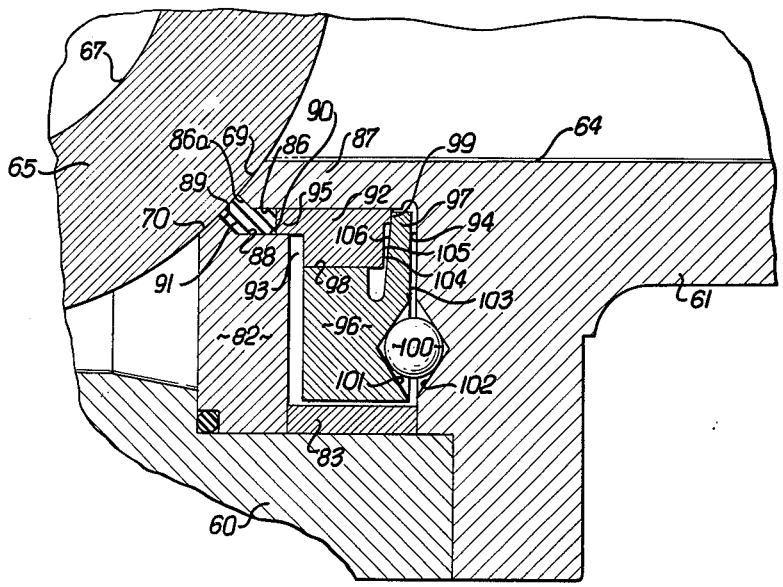
FIG. 6 is an enlarged fragmentary section showing the FIG. 5 valve seal engaging the plug in response to operation of the pressure transmitting means.

Referring now to FIGS. 5 and 6, the plug type valve assembly includes a flanged body 60 and a flanged body cap 61 connected by cap screws 62 and together forming a valve chamber 63 having coaxial inlet and outlet passages 64 in communication therewith. A valve stopper 65 in the general form of a spherical plug is positioned in the chamber for rotation therein about a vertical axis 66 through horizontal passage 67 in the stopper into and out of registration with horizontal passages 64 for controlling fluid flow through the valve.

In general there is a slight clearance between the stopper surface and the faces 68, 69, and 70 of the body parts forming the chamber 63 so that the stopper may be turned inside the chamber by rotation of the vertical spindle 71 to which it is keyed at 72. A stopper trunnion 73 extending vertically and coaxially with the spindle pivotally mounts the stopper for rotation.

The spindle 71 is centered by a bushing 74 received within a vertical bore 75 in body 60 and contains a pair of annular recesses 76 filled with plastic packing injected under pressure to seal off between the bushing and the spindle and also between the bushing and the bore 75. The spindle projects upward through the bushing and into a gear segment 77 meshing with the pinion 78 rotated by handwheel 79 through screw shaft 80 as will be described. Thus, clockwise rotation of the handwheel effects counterclockwise rotation of the gear segment displacing a pair of segment shoulders respectively away from and toward a stop pin 81 and also turning the stopper counterclockwise so that its passage 67 turns out of communication with the inlet and outlet passages 64 followed by engagement of a segment shoulder with the stop pin. Conversely, counterclockwise rotation of the handwheel rotates the stopper to open position at which time the segment other shoulder engages the stop pin.

Body 60 also mounts an annular retainer 82 held in position by a spacer ring 83 extending between the retainer and the face 84 of the body cap 61, both the retainer and the ring being mounted coaxially with the common axis 85 of passages 64.

The outer surface 86 of annular portion 87 of the body cap 61 together with bore 88 and shoulder 89 of the retainer 82 define an annular cavity 90 extending about passages 64 and 67 and adjacent the stopper surface, and a packing annulus 91 formed of internally tenacious relatively rigid packing material, preferably comprising an inert substance such as molded tetrafluoroethylene or asbestos, is mounted in the cavity with a press or sealing fit between and against surfaces 86 and 88, and 86a and 89, as better shown in FIG. 6. For bodily displacing the packing into sealing engagement with the stopper surface with uniform pressure, an annular thrust ring 92 is mounted in a space 93 between the retainer 82 and the face 94 of the body cap 61 for a sliding fit upon cylindrical outer surface 86 of the annular body cap portion 87, the thrust ring including an annular boss or tongue 95 received within the cavity and acting with the retainer, body cap portion 87 and the stopper to substantially confine the packing in the cavity at times when the packing is thrust into sealing engagement with the stopper.

As the thrust ring tongue 95 moves into the cavity and into engagement with the packing, bodily displacing it first against shoulder 89 of retainer 82 and then toward the stopper, the packing material is deformed and pushed against the stopper surface, forming a seal between the stopper 65, retainer 82 and body portion 87. Thereafter, when sealing pressure on the thrust ring is relieved, the relatively rigid and somewhat elastic packing material tends to be retracted bodily away from the stopper by pressural contact with shoulder 89, and any fluid pressure within the valve chamber assists in bodily moving the packing away from the stopper since the space 93 remains at atmospheric pressure; however, that portion of the packing which was pushed into the cavity mouth tends to retain some of its thickened end shape and therefore tends to maintain a press or sealing fit with walls 86, and 88, to seal off the cavity 90 from fluids leaking between the stopper and the retainer and body portion 87 as the valve is opened. As a result, fluids cannot enter the cavity and come in contact with the thrust ring and other mechanical parts to be described.

The thrust ring 92 is a portion of the means for transmitting pressure acting to thrust the packing toward and into sealing engagement with the plug stopper structure, such means also including a resilient part positioned to flex without relieving the essential pressure transmission in response to deflection of the pressurized packing. That part may comprise the flexure 97 on annular member 96 and positioned for flexing in space 93. As shown, member 96 has a bore 98 receiving the thrust ring 92 which engages the flexure at pressure transmitting interface 99. In this regard, the flexure is in the form of a flat spring extending in a plane normal to the axis of the thrust ring, and the latter extends generally between the flexure and the thrust ring.

The means for transmitting pressure also includes the circularly spaced series of rollers or balls 100 confined between conical recess walls 101 and 102 formed in the opposed faces 103 and 94 of the member 96 and cap 61 respectively, thereby providing anti-friction camming for engaging and axially bodily moving the member 96 upon rotation. Accordingly, axial displacement is transmitted from flexure 97 to ring 92 and then to the packing. As previously described, the flexure functions to compensate for the higher rate of thermal expansion and contraction of the seal 91 and also for axial movement of the plug stopper 65 caused by a change in pressure. A controlled width gap 104 between stop shoulders 105 and 106, on the ring 92 and flexure 97 respectively, prevents over deflection of the flexure, through interengagement of such shoulders.

Rotation is transmitted to the member 96 by downward movement of the cam 107 seen in FIG. 5 as projecting downward from plunger 108 into a recess 109 formed in the member 96, the cam engaging a lip 110 of the member 96 for rotationally displacing the latter about axis 85 when the cam is moved downward. Such action takes place after the stopper has been rotated to closed position as previously described, all in response to rotation of the handwheel 79 and as more fully described in my U.S. Patent 2,863,629 issued December 9, 1958.

Figure 7:
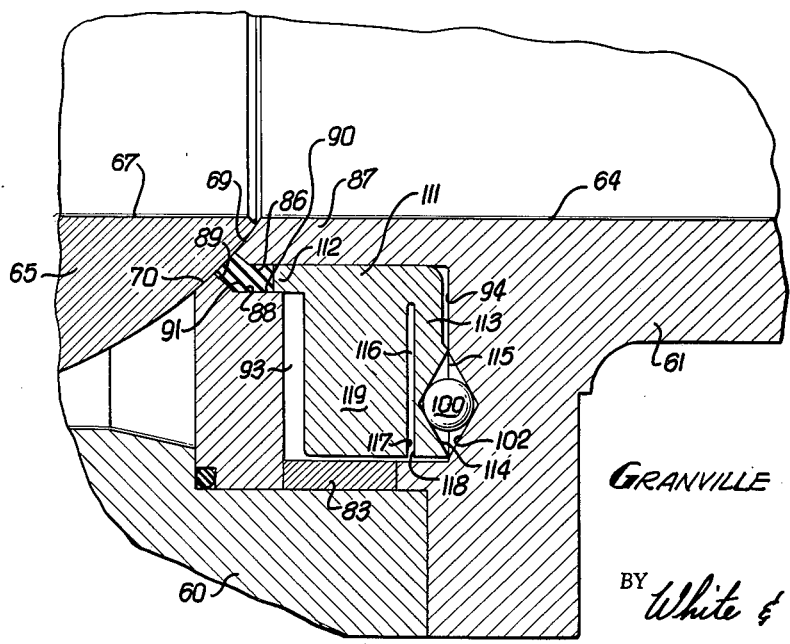
FIG. 7 is a view similar to FIG. 6, but showing a modification of the invention.

In FIG. 7, the elements remain the same as described and shown in connection with FIG. 6, excepting for elements 92, 95, 96, 97, 98, 99, 101, 104, 105 and 106 therein identified. Modified elements include the integral annular member 111 and thrust ring 112 which projects into cavity 90 for pressural engagement with the packing annulus 91, and the flat spring annular flexure part 113 carried on the member 111.

The means for transmitting pressure includes the circularly spaced series of balls 100 confined between conical recess walls 102 and 114 formed in the opposed faces 94 and 115 of the cap 61 and flexure 113 respectively, thereby providing anti-friction camming for engaging and axially bodily moving the integral flexure 113, member 111 and ring 112 upon rotation thereof. Accordingly, axial displacement is transmitted from flexure 113 to member 111, and then to the ring 112 to the packing 91. As previously described, the flexure functions to compensate for the higher rate of thermal expansion and contraction of the seal 91, and also for axial movement of the plug stopper 65 caused by a change in pressure.

A controlled width gap 116 between stop shoulders 117 and 118 respectively on the portion 119 of member 111 and on the flexure 113 prevents over deflection of the flexure, through interengagement of such shoulders at a time when predetermined maximum energy is stored in the flexure.

I claim:

1. In a valve assembly including body structure forming a chamber having inlet and outlet passages for flowing fluid therethrough and stopper structure movable into and out of a position blanking a fluid flow passage within the chamber, certain of said structure forming a cavity extending about a chamber flow zone and being blanked by other of said structure when the stopper is in said position, and internally tenacious packing in the cavity, the improvement comprising means for effecting thrusting of the packing toward and into sealing engagement with said stopper structure and pressurizing said packing only after the stopper has arrived in said position, said means including a resilient part positioned to flex and thereby store energy during initial pressurization of said packing, said energy storage assuring continued pressurization of the packing to seal against said other structure during subsequent deflection of the packing while said part remains flexed.

2. In a valve assembly including body structure forming a chamber having inlet and outlet passages for flowing fluid therethrough and stopper structure movable into and out of a position blanking a fluid flow passage within the chamber, certain of said structure forming a cavity extending about a chamber flow zone and being blanked by other of said structure when the stopper is in said position, and internally tenacious packing in the cavity, the improvement comprising means for effecting thrusting of the packing toward and into sealing engagement with said other structure and pressurizing said packing only after the stopper has arrived in said position, said means including a thrust ring and a resilient part positioned to flex and thereby store energy during initial pressurization of said packing by said thrust ring, said energy storage assuring continued pressurization of the packing to seal against said other structure during subsequent deflection of the packing and of said thrust ring while said part remains flexed.

3. In a valve assembly including body structure forming a chamber having inlet and outlet passages for flowing fluid therethrough and stopper structure movable into and out of a position blanking a fluid flow passage within the chamber, certain of said structure forming a cavity extending about a chamber flow zone and being blanked by other of said structure when the stopper is in said position, and internally tenacious packing in the cavity, the improvement comprising means for effecting thrusting of the packing toward and into sealing engagement with said other structure and pressurizing said packing only after the stopper has arrived in said position, said means including a thrust ring engaging the packing, an annular member and a resilient flexure part positioned to flex and thereby store energy during initial pressurization of said packing, one of said ring and member being rotatable independently of stopper movement, the ring being simultaneously bodily movable toward the packing during subjection of the flexure part to energy storing flexing all in response to said rotation said energy storage assuring continued pressurization of the packing to seal against said other structure during subsequent deflection of said packing and of said thrust ring while said part remains flexed, and a control actuable to move the stopper to closed position and thereafter effect said rotation to secure movement of said ring to transmit said pressure in response to actuation of the control.

4. The invention as defined in claim 3 in which said thrust ring extends between the packing and said flexure, said flexure is in the form of a flat spring extending in a plane generally normal to the axis of said ring and said means includes an anti-friction cam element in the path of rotation of one of said ring and member for engaging and axially bodily moving said one during said rotation thereof.

5. The invention as defined in claim 4 in which said cam element comprises a circularly spaced series of rollers, the said one of the ring and member having shoulders angled in the direction of said axial displacement and rotation and engaged by said rollers.

6. The invention as defined in claim 4 in which said packing has a higher rate of thermal expansion than said structure forming the cavity and is subject to expand upon heating to drive said thrust ring in a direction to flex said flexure part when the stopper is in said position and the packing is in sealing engagement therewith.

7. The invention as defined in claim 4 in which the thrust ring is rotatable relative to said flexure part in response to closing movement of the stopper structure, there being interengageable shoulders carried on the stopper and thrust ring and spaced from said part for effecting said relative rotation.

8. The invention as defined in claim 7 in which the stopper is linearly movable between open and closed positions.

9. The invention as defined in claim 4 in which the thrust ring and member are coaxially rotatable, and including a cam element movable to effect rotation of said member after closing of the stopper, the stopper being mounted for rotation between open and closed positions.

10. The invention as defined in claim 4 including spaced stop shoulders interengageable to limit flexing of said flexure part and thereby prevent over-deflection thereof.

11. The invention as defined in claim 10 in which the stop shoulders are on the flexure part and said member.

12. The invention as defined in claim 4 in which the thrust ring and said member are integral.

13. The invention as defined in claim 4 in which the thrust ring, said member and said flexure part are all integral.

References Cited by the Examiner
UNITED STATES PATENTS

| | | | |
|---|---|---|---|
| 2,562,285 | 7/1951 | Timmer | 251—327 X |
| 2,567,032 | 9/1951 | Schmidt | 251—175 X |
| 2,696,967 | 12/1954 | Wilson | 251—174 |
| 2,726,843 | 12/1955 | Evans | 251—333 |
| 2,863,629 | 12/1958 | Knox | 251—187 X |
| 2,925,245 | 2/1960 | Lucas | 251—188 |
| 2,952,437 | 9/1960 | Knox | 251—187 X |
| 3,064,938 | 11/1962 | Knox | 251—188 X |
| 3,073,349 | 1/1963 | Mitchell | 251—172 X |

ISADOR WEIL, *Primary Examiner.*

CLARENCE R. GORDON, *Examiner.*